(12) United States Patent
Rain

(10) Patent No.: US 10,753,480 B2
(45) Date of Patent: Aug. 25, 2020

(54) VALVES INCLUDING MULTIPLE SEATS AND RELATED ASSEMBLIES AND METHODS

(71) Applicant: Flowserve Management Company, Irving, TX (US)

(72) Inventor: Mark Rain, Raleigh, NC (US)

(73) Assignee: Flowserve Management Company, Irving, TX (US)

( * ) Notice: Subject to any disclaimer, the term of this patent is extended or adjusted under 35 U.S.C. 154(b) by 140 days.

(21) Appl. No.: 16/168,510

(22) Filed: Oct. 23, 2018

(65) Prior Publication Data

US 2019/0056033 A1    Feb. 21, 2019

Related U.S. Application Data

(62) Division of application No. 15/332,922, filed on Oct. 24, 2016, now Pat. No. 10,125,874.

(51) Int. Cl.
*F16K 1/44* (2006.01)
*F16K 1/46* (2006.01)
(Continued)

(52) U.S. Cl.
CPC .............. *F16K 1/443* (2013.01); *F16K 1/205* (2013.01); *F16K 1/2071* (2013.01); *F16K 1/46* (2013.01);
(Continued)

(58) Field of Classification Search
CPC .......... F16K 1/443; F16K 1/46; F16K 15/063; F16K 1/205; F16K 1/2071; F16K 15/026;
(Continued)

(56) References Cited

U.S. PATENT DOCUMENTS 1,679,779 A    8/1928   Oberhuber
2,481,713 A    9/1949   Alex
(Continued)

FOREIGN PATENT DOCUMENTS

CN        1220726 A      6/1999
CN      201412569 Y      2/2010
(Continued)

OTHER PUBLICATIONS

"The PBV(Registered) Series 5700/6700 Three-Piece, Side-Entry, Trunnion Ball Valve 2"-56" ANSI class 150/300, 600, 900, 1500 & 2500 in Full and Standard Port", PBV's Engineering Excellence at Work, p. 8.

(Continued)

*Primary Examiner* — John Bastianelli
(74) *Attorney, Agent, or Firm* — Phillips Winchester; Gregory C. Baker

(57) ABSTRACT

Valve assemblies include a valve body having a fluid passage through the valve body and a valve member disposed in a chamber of the valve body. The valve assembly further includes a first seat and a second seat, where both seats are configured to contact and provide a seal between the valve body and the valve member to at least partially inhibit fluid flow through the fluid passage. Methods of providing a seal in a valve include forcing a primary seat into a seat portion of a valve body to provide a seal between a valve member and the valve body with the primary seat and deflecting at least one arm of a secondary seat to provide another seal between the valve member and the valve body with the secondary seat.

20 Claims, 6 Drawing Sheets

(51) Int. Cl.
| | |
|---|---|
| *F16K 15/06* | (2006.01) |
| *F16K 1/20* | (2006.01) |
| *F16K 15/02* | (2006.01) |
| *F16K 15/03* | (2006.01) |
| *F16K 25/00* | (2006.01) |
| *F16K 25/02* | (2006.01) |

(52) U.S. Cl.
CPC ............ *F16K 15/026* (2013.01); *F16K 15/03* (2013.01); *F16K 15/063* (2013.01); *F16K 25/005* (2013.01); *F16K 25/02* (2013.01); *Y10T 137/7898* (2015.04)

(58) Field of Classification Search
CPC ........ F16K 15/03; F16K 25/005; F16K 25/02; F16K 1/32; F16K 1/42; F16K 25/00; Y10T 137/7898; Y10T 137/7903
USPC ........ 251/172, 174, 298–303, 332–334, 337; 137/527–527.8
See application file for complete search history.

(56) References Cited

U.S. PATENT DOCUMENTS

| | | | |
|---|---|---|---|
| 2,482,198 A | 9/1949 | Melichar | |
| 2,969,951 A | 1/1961 | Walton | |
| 2,981,282 A | 4/1961 | Mack | |
| 3,029,835 A | 4/1962 | Biello et al. | |
| 3,075,547 A | 1/1963 | Domer | |
| 3,228,651 A | 1/1966 | Katumi | |
| 3,433,250 A | 3/1969 | Hagihara | |
| 3,548,868 A | 12/1970 | Mullaney | |
| 3,701,361 A | 10/1972 | Bunn et al. | |
| 3,710,821 A * | 1/1973 | Turetsky | F16K 17/006 137/527.8 |
| 3,837,357 A | 9/1974 | Slaughter | |
| 3,861,646 A | 1/1975 | Douglas | |
| 4,090,529 A | 5/1978 | Schuller et al. | |
| 4,114,856 A | 9/1978 | MacAfee et al. | |
| 4,172,469 A | 10/1979 | Boehringer | |
| 4,194,528 A | 3/1980 | Kepler | |
| 4,208,035 A | 6/1980 | Alvarez et al. | |
| 4,531,532 A * | 7/1985 | Zimmerly | F16K 1/38 137/15.06 |
| 4,531,541 A | 7/1985 | Hartshorn | |
| 4,537,384 A | 8/1985 | Petersen et al. | |
| 4,569,365 A | 2/1986 | Namand et al. | |
| 4,583,596 A | 4/1986 | Davis | |
| 4,674,575 A | 6/1987 | Guess | |
| 4,706,706 A | 11/1987 | Page et al. | |
| 4,846,216 A | 7/1989 | Raymond | |
| 4,911,407 A | 3/1990 | Paul, Jr. | |
| 4,949,746 A | 8/1990 | Kay | |
| 5,088,687 A | 2/1992 | Stender | |
| 5,326,079 A | 7/1994 | Ferrando et al. | |
| 5,893,389 A | 4/1999 | Cunningham | |
| 6,125,822 A | 10/2000 | Janik et al. | |
| 6,623,012 B1 | 9/2003 | Perry et al. | |
| 6,651,693 B2 | 11/2003 | Simmons et al. | |
| 6,675,110 B2 | 1/2004 | Engelmann | |
| 6,948,699 B1 | 9/2005 | Keiser | |
| 6,959,718 B2 | 11/2005 | Kayahara et al. | |
| 6,983,641 B1 | 1/2006 | Perry et al. | |
| 7,025,084 B2 | 4/2006 | Perry et al. | |
| 7,040,301 B2 | 5/2006 | Perry et al. | |
| 7,086,276 B2 | 8/2006 | Cook et al. | |
| 7,121,267 B2 | 10/2006 | Perry et al. | |
| 7,225,831 B2 | 6/2007 | Hope et al. | |
| 7,303,194 B2 | 12/2007 | Smith, III | |
| 7,624,755 B2 | 12/2009 | Benda et al. | |
| 7,789,639 B2 | 9/2010 | Alaze | |
| 7,836,909 B2 | 11/2010 | Church | |
| 8,869,826 B2 | 10/2014 | Chappel et al. | |
| 8,888,069 B2 | 11/2014 | Maruno et al. | |
| 9,394,900 B2 | 7/2016 | Roman et al. | |
| 2002/0096149 A1 | 7/2002 | Perry et al. | |
| 2002/0096151 A1 | 7/2002 | Perry et al. | |
| 2002/0096152 A1 | 7/2002 | Perry et al. | |
| 2004/0140626 A1 | 7/2004 | Hall et al. | |
| 2004/0173263 A1 | 9/2004 | Perry et al. | |
| 2004/0226544 A1 | 11/2004 | Perry et al. | |
| 2004/0237630 A1 | 12/2004 | Cook et al. | |
| 2004/0250863 A1 | 12/2004 | Atkeson et al. | |
| 2005/0016597 A1 | 1/2005 | Hope et al. | |
| 2005/0082764 A1 | 4/2005 | Smith, III | |
| 2006/0027771 A1 | 2/2006 | Baumann | |
| 2007/0131286 A1 | 6/2007 | Benda et al. | |
| 2008/0073605 A1 | 3/2008 | Ishigaki et al. | |
| 2011/0024662 A1 | 2/2011 | Seveso et al. | |
| 2011/0114863 A1 | 5/2011 | Nelson et al. | |
| 2012/0048403 A1 | 3/2012 | Chappel et al. | |
| 2012/0091385 A1 | 4/2012 | Nebel | |
| 2012/0126161 A1 | 5/2012 | Jeshani et al. | |
| 2012/0204977 A1 | 8/2012 | Lembcke | |
| 2014/0034326 A1 | 2/2014 | Mahmoud et al. | |
| 2014/0183396 A1 | 7/2014 | Hunter et al. | |
| 2014/0264135 A1 | 9/2014 | Bell | |
| 2015/0000748 A1 | 1/2015 | Shelcoviz et al. | |
| 2016/0195189 A1 | 7/2016 | Fletcher et al. | |

FOREIGN PATENT DOCUMENTS

| | | |
|---|---|---|
| CN | 101776157 B | 10/2011 |
| CN | 202719212 U | 2/2013 |
| CN | 203240024 U | 10/2013 |
| EP | 0122740 A2 | 10/1984 |
| EP | 0512594 B1 | 3/1996 |
| EP | 1197696 A1 | 4/2002 |
| EP | 1860315 A2 | 11/2007 |
| FR | 2478255 A1 | 9/1981 |
| JP | 2007-132441 A | 5/2007 |
| JP | 2011-133104 A | 7/2011 |
| JP | 4723980 B2 | 7/2011 |
| WO | 2012/059758 A1 | 5/2012 |
| WO | 20161007127 A1 | 1/2016 |

OTHER PUBLICATIONS

"Securaseal Metal-sealed ball valves", Velan, 2015, pp. 1-28, VEL-MS-2003b, Velan Inc., Montreal, Canada.

"Noble Alloy Valve Hardened Metal and Soft Sealed Ball Valves for Tough Services and High-Pressure Applications", 2013, pp. 1-8, Bulletin NAENTB0007 (E/A4), Flowserve Corporation.

"In-Line Check Valves", Bulletin 50-20B, Type CK4A, Installation, Service and Parts Information, Refrigerating Specialties Division, ISO 9000-2000 Certified, Mar. 2002, pp. 1-4, Park Hannifin Corporation.

"Floating Ball Valves" and "Trunnion Mounted Ball Valves", Design Features, pp. 5, 6 and 22-25.

"Dual-Seat Check Valve for Isolation Service", Flowserve Anchor/Darlin Valves, FCD ADAMS8009-01, 2011, 2 pages, Flowserve Corporation.

Anchor Darling 1878 Piston Check Valves Installation Operation Maintenance Sizes 1/2" through 2", Instruction Manual, FCD ADENIM0005-00, 2006, pp. 1-17, 1878, Flowserve Corporation.

* cited by examiner

VALVES INCLUDING MULTIPLE SEATS AND RELATED ASSEMBLIES AND METHODS

CROSS-REFERENCE TO RELATED APPLICATIONS

This application is a divisional of U.S. patent application Ser. No. 15/332,922, filed Oct. 24, 2016, the disclosure of which is hereby incorporated herein in its entirety by this reference.

TECHNICAL FIELD

Embodiments of the disclosure relate generally to valves including multiple seats. More particularly, embodiments of the disclosure relate to valves including at least a first seat and a second seat, each of which may at least partially comprise a metal material (e.g., a metal seat), and to related assemblies including such valves and to related methods.

BACKGROUND

There are numerous types of valves for controlling fluid flow along a fluid pathway, such as, check valves, plug valves, ball valves, stop or globe valves, angle valves, butterfly valves, and gate valves. Check valves, for example, may include a valve member, such as a valve disc, that may be moved between an opened and a closed position by fluid (e.g., liquid). For example, pressure from fluid flow through the valve, fluid pressure proximate at least one side of the valve disc, or a lack of fluid pressure on either side of the valve may act to open or close the valve. In some embodiments, check valves may be biased in a closed position via a spring, gravity, or other mechanism.

Fluid that flows against the disc during normal operation opens the valve, allowing fluid to flow through the valve in a forward direction. If the fluid reverses flow so that there is no longer any flow in the forward direction, the disc may at least partially close due to an imbalance of pressure (e.g., a pressure differential) on either side of the valve (e.g., an upstream side and a downstream side) and/or due to an external biasing force, where implemented. In a check valve, this type of closing of the valve, at least partially prevents fluid from flowing through the valve in an unintended direction.

Check valves are commonly used in piping systems to at least partially prevent backflow from damaging systems that are upstream of the valve. For example, check valves can be used in a piping system that includes another fluid flow component (e.g., a pump) that is positioned upstream of the check valve. Should flow reverse, reversing flow should not be permitted to come into communication with (e.g., travel through) the pump. For example, reverse flow into the turbine of a pump could cause serious damage to the pump.

Check valves may also be utilized in applications requiring relatively higher reliability in the components of the check valve (e.g., the valve seat or seats) and in applications involving one or more of high-pressure, high-temperature, caustic, corrosive, and/or abrasive environments. For example, in a nuclear power plant, a flow path is coupled to the nuclear reactor that will allow cooling water to enter a containment center in the event of an accident. Flow is permitted from the cooling reservoir into the containment center in order to cool the reactor. However, reverse flow is highly undesirable since it will potentially allow hot, radioactive material to flow outside the containment center. Check valves are often utilized in systems, such as this, in order to prevent the reverse flow of fluid through the check valve.

As pressure differences are often used to open and close check valves, as discussed above, in most working environments, it is desirable that the check valves operate and be reliable at both high and low differential pressures to provide a sealing force between valve seats within the valve. However, the internal components of the check valve are generally required to substantially withstand high differential pressures, high closing loads, and, in some instances, harsh environmental conditions that may damage or reduce the reliability of conventional valve components, such as elastomer or polymer valve seats.

BRIEF SUMMARY

In some embodiments, a valve assembly may include a primary and a secondary seat. The secondary seat is configured to seal with low sealing forces (i.e., low differential pressures) and the primary seat is configured to limit the deflection of the secondary seat and provide an additional seal and rigidity under high sealing forces (i.e., higher differential pressures).

In some embodiments, a valve assembly includes a valve body having a fluid passage through the valve body where the valve body comprises a seat portion. The valve assembly further includes a valve member disposed in a chamber of the valve body that is in communication with the fluid passage. The valve member is movable relative to the valve body and includes a first seat comprising a metal material configured to contact and provide a seal between the seat portion of the valve body and the valve member to at least partially inhibit fluid flow through the fluid passage and a second seat comprising a metal material configured to contact and provide another seal between the seat portion of the valve body and the valve member to at least partially inhibit fluid flow through the fluid passage. The second seat is configured to contact the seat portion of the valve body in a first position of the valve member, wherein the first seat is spaced from the seat portion of the valve body in the first position.

In additional embodiments, a valve assembly includes a valve body comprising a seat portion and having a fluid passage through the valve body. The valve assembly further includes a valve member disposed in a chamber of the valve body in communication with the fluid passage. The valve member is movable relative to the valve body. The valve assembly further includes a rigid seat configured to contact and provide a seal between the seat portion of the valve body and the valve member to at least partially inhibit fluid flow through the fluid passage and a flexible seat comprising a metal material. The flexible seat is configured to deflect toward and contact the seat portion of the valve body in response to a force applied to the flexible seat in order to provide another seal between the seat portion of the valve body and the valve member to at least partially inhibit fluid flow through the fluid passage.

In additional embodiments, a valve assembly includes a primary seat configured to be forced into a seat portion of a valve body to provide a seal between a valve member and the valve body with the primary seat. The valve assembly further includes a secondary seat having at least one arm configured to deflect toward the seat portion of the valve body to provide another seal between the valve member and the valve body with the secondary seat.

In some embodiments, methods of providing a seal in a valve include forcing a secondary seat into the seat portion of a valve body to provide a seal between a valve member and the valve body and deflecting the secondary seat until the primary seat contacts the valve body in order to provide another seal between the valve member and the valve body.

In further embodiments, methods of providing a seal in a valve includes forcing a primary seat into a seat portion of a valve body to provide a seal between a valve member and the valve body with the primary seat and deflecting at least one arm of a secondary seat to provide another seal between the valve member and the valve body with the secondary seat.

DETAILED DESCRIPTION

The technology described herein relates generally to valves for controlling fluid flow along a fluid pathway. Valves (e.g., check valves, globe valves, etc.) of this sort may be implemented in piping systems, such as those in commercial nuclear power plants and boiler applications, where it is desirable to have the valve to restrict (e.g., prevent) certain types of fluid flow. For example, the valve may restrict fluid flow in backflow situations in order to avoid damage to associated components of the system in which the valve is implemented or even catastrophic failure in the system.

The following description provides specific details, such as sizes, shapes, material compositions, and orientations in order to provide a thorough description of embodiments of the disclosure. However, a person of ordinary skill in the art would understand that the embodiments of the disclosure may be practiced without necessarily employing these specific details. Embodiments of the disclosure may be practiced in conjunction with conventional fabrication techniques employed in the industry.

The illustrations presented herein are, in some instances, not actual views of any particular device, component, structure, element, or other feature, but are merely idealized representations that are employed to describe embodiments of the present disclosure. Additionally, elements common between figures may retain the same numerical designation.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

It is noted that while embodiments of the instant disclosure are discussed herein primarily with reference to check valves (e.g., swing or tilt check valves, in-line check valves, piston check valves, stop-check valves, lift-check valves, etc.), other embodiments of the disclosure may include multiple seats for other types of valves, such as, for example, plug valves, ball valves, stop or globe valves, angle valves, butterfly valves, and gate valves. For example, as discussed below with reference to FIG. 7, a globe valve (e.g., a plug and corresponding seat) may be configured with at least two seats (e.g., a low pressure and a high pressure metal seat) in a manner similar to that discussed below with reference to check valves.

Figure 1:
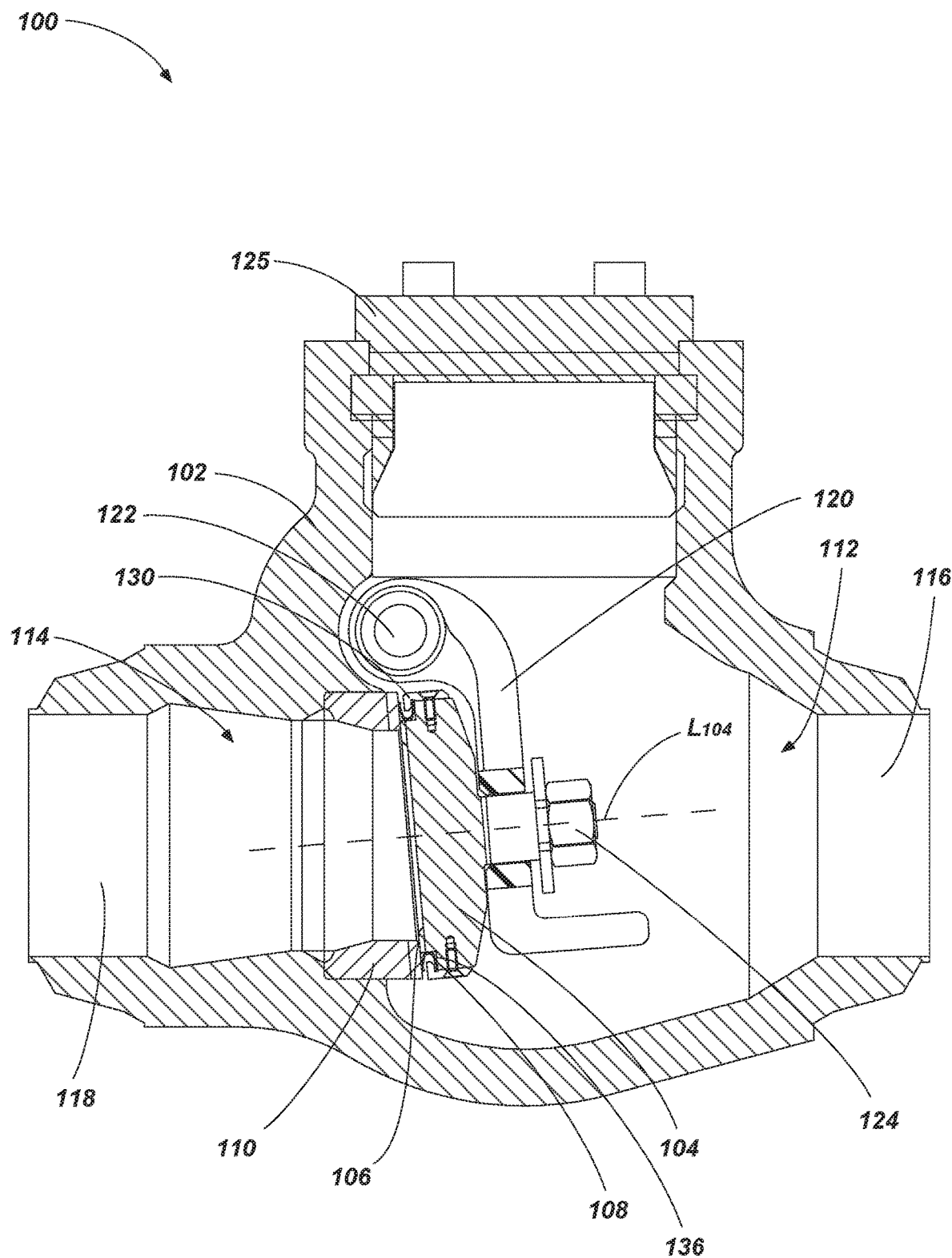
FIG. 1 is a partial cross-sectional side view of a valve with a valve member in a closed position in accordance with embodiments of the disclosure.

FIG. 1 shows a partial cross-sectional side view of a valve 100 (e.g., a check valve) having a valve body 102 and a valve member 104 (e.g., a valve disc) in a closed position (e.g., in a high pressure or high pressure differential sealing position). As shown in FIG. 1, the valve body 102 defines a fluid pathway through the valve body 102. The valve member 104 is disposed in the valve body 102 in communication with the fluid pathway.

The valve 100 includes multiple valve seats (e.g., two seats, three seats, four seats, or more). For example, the valve 100 includes a first valve seat 106 and second valve seat 108. As depicted, one or more of the first seat 106 and the second seat 108 may be positioned on the valve member 104 and may extend around an outer portion (e.g., an outer periphery) of the valve member 104. For example, the first seat 106 and the second seat 108 may extend around a longitudinal axis $L_{104}$ of the valve member 104 (e.g., the first seat 106 and the second seat 108 may circumscribe portions of the valve member 104). The second seat 108 may be positioned outward (e.g., laterally or radially outward) from the first seat 106. In other embodiments, the second seat 108 may be positioned inward (e.g., laterally or radially inward) from the first seat 106. In some embodiments, the second seat 108 may be positioned in a cutout portion (e.g., recess 136 in an outer portion of the valve member 104).

As depicted, the first seat 106 may be considered a high pressure seat (e.g., a primary seat). For example, the first seat 106 may comprise a material having a relatively higher hardness and/or toughness, such as, as metal material (e.g., as compared to the second seat 108 and/or to other seat materials such as a polymer or a rubber or a relatively more flexible or deformable metal material). The first seat 106 may provide a metal-to-metal seal between a seat portion 110 of the body 102 of the valve 100 (e.g., a body seat) and the valve member 104. In some embodiments, the first seat 106 and/or the seat portion 110 of the valve 100 may comprise a metal material, such as, for example, steel, chrome, iron, metal particle matrix composites, alloys (e.g., nickel alloys, such as, INCONEL®, stainless steel, cobalt alloys, such as, STELLITE®), or combinations thereof. In some embodiments, the first seat 106 may be comprised entirely of (e.g., consist of) a metal material.

In the closed position, the first seat 106 on the valve member 104 may seat against the seat portion 110 of the body 102 in a situation where a relativity high pressure fluid is acting on a first side 112 of the valve member 104. For example, the valve 100 may exhibit a relatively large pressure differential between the first, high pressure side 112 and a second side 114 having a relatively lower pressure fluid (or a lack of fluid) at the second, low pressure side 114. The fluid on the first, high pressure side 112 may force the valve member 104 into the seat portion 110 of the body 102 to create a seal (e.g., a metal-to-metal seal) between the first seat 106 and the seat portion 110 of the body 102. The seating or sealing between the first seat 106 and the seat portion 110 of the body 102 may provide a substantially fluid-tight seal within the valve 100 at least partially inhibiting (e.g., entirely inhibiting) fluid flow through the valve 100 (e.g., to prevent fluid flow, such as backflow, from the first side 112 to the second side 114). The material of the first seat 106 and the seat portion 110 of the body 102 may be selected to provide a seal with minimal deflection or deformation (e.g., substantially no deformation, i.e., a rigid seat) when the first seat 106 and the seat portion 110 of the body 102 are forced into contact by the fluid pressure on the first side 112. In some embodiments, at least a portion of the material of the seat portion 110 and or the first seat 106 (e.g., an interface portion configured to contact another seating surface) may be treated to further increase the material's resistance to wear (e.g., with a hardfacing material, such as cobalt alloys, e.g., STELLITE®).

In some embodiments, a primary seal or seat between the first seat 106 and the seat portion 110 may be provided at pressure differentials that are greater than 100 psi (about 0.689 MPa), greater than 500 psi (about 3.447 MPa), greater than 800 psi (about 5.516 MPa), greater than 1,000 psi (about 6.895 MPa), or greater. In some embodiments, such pressure differential may be less than a maximum valve rated pressure (e.g., 3,750 psi (about 25.855 MPa), 6,250 psi (about 43.092 MPa), 11,250 psi (about 77.566 MPa)).

A portion of the valve 100 at the first side 112 may include a first port 116 that may be connected to another portion of a system in which the valve 100 is utilized (e.g., downstream piping) and another portion of the valve 100 at the second side 114 may include a second port 118 that may be connected to yet another portion of the system (e.g., upstream piping).

Figure 2:
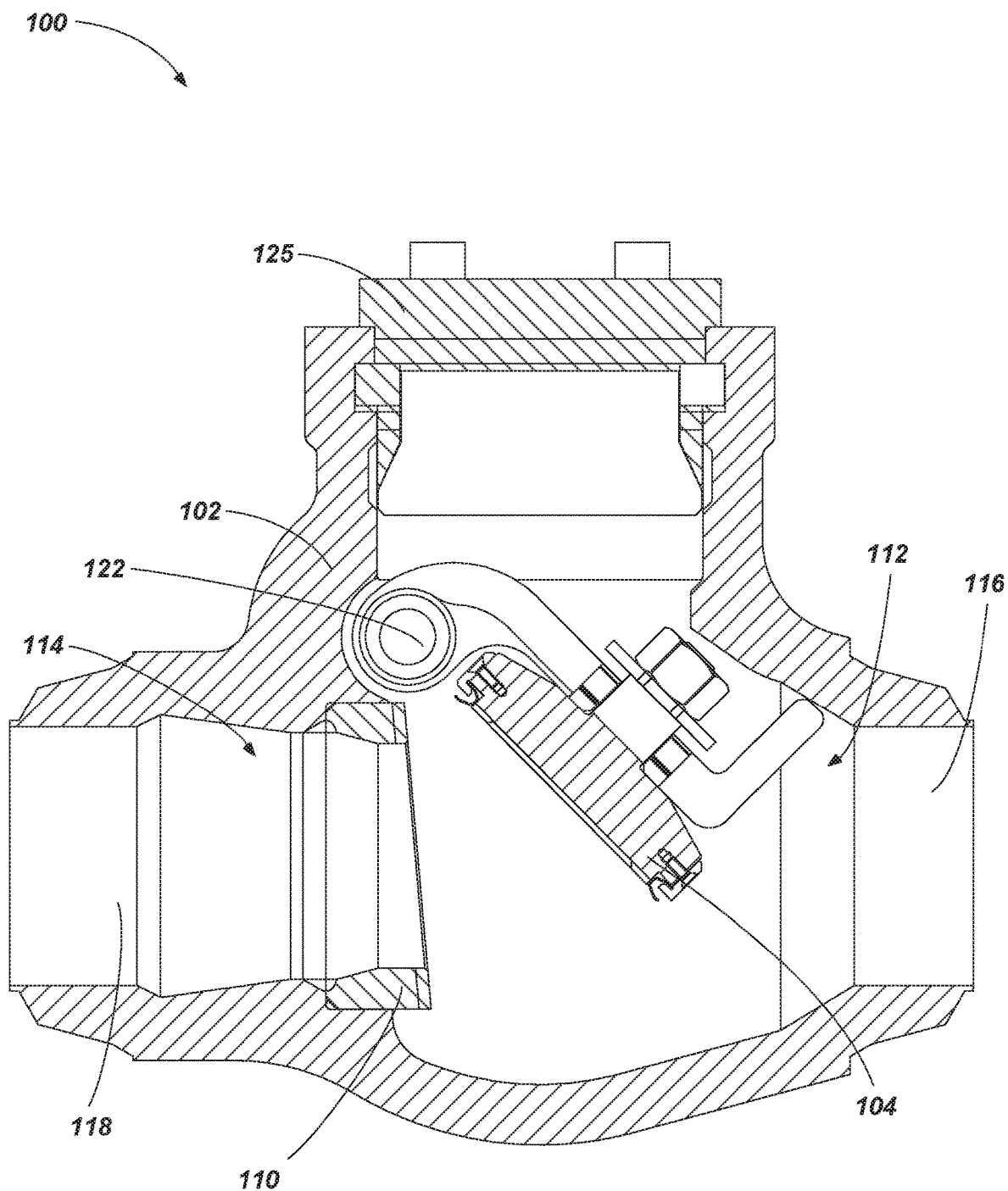
FIG. 2 is a partial cross-sectional side view of the valve of FIG. 1 with the valve member in an open position.

In a swing check valve 100 configuration, the valve member 104 may be coupled to a rotation arm 120 that rotates about a pivot 122. In some embodiments, the valve member 104 may be removably connected to the rotation arm 120 (e.g., via a mechanical coupling 124). In some embodiments, the connection between the valve member 104 and the rotation arm 120 may enable the valve member 104 to move (e.g., back and forth relative to the seat portion 110 and/or side to side and up and down relative to the seat portion 110) in order to enhance the seating between the valve member 104 and the seat portion 110 of the valve body 102. Rotation of the valve member 104 and rotation arm 120 about the pivot 122 in a first direction (e.g., a clockwise direction) may place the valve member 104 in contact with the seat portion 110 of the body 102, as shown in FIG. 1. In a similar manner, and as shown in FIG. 2, which shows the valve member 104 in an open position, rotation of the valve member 104 and rotation arm 120 about the pivot 122 in a second direction (e.g., a counterclockwise direction) may begin to remove the valve member 104 from contact with the seat portion 110 of the body 102.

Referring back to FIG. 1, the second seat 108 may be positioned on and coupled to (e.g., via a coupling member 130) an outer portion of the valve member 104. In other embodiments, the second seat 108 may be positioned on and coupled to the valve body 102.

In some embodiments, in addition to or alternate from the pressure differential, another mechanism (e.g., a biasing element, such as spring assisted, a motor, etc.) may act to place (e.g., force) the valve member 104 in the closed position.

In some embodiments, the valve 100 may include access port 125 that enables access to internal components of the valve 100 for maintenance and/or assembly.

Figure 3:
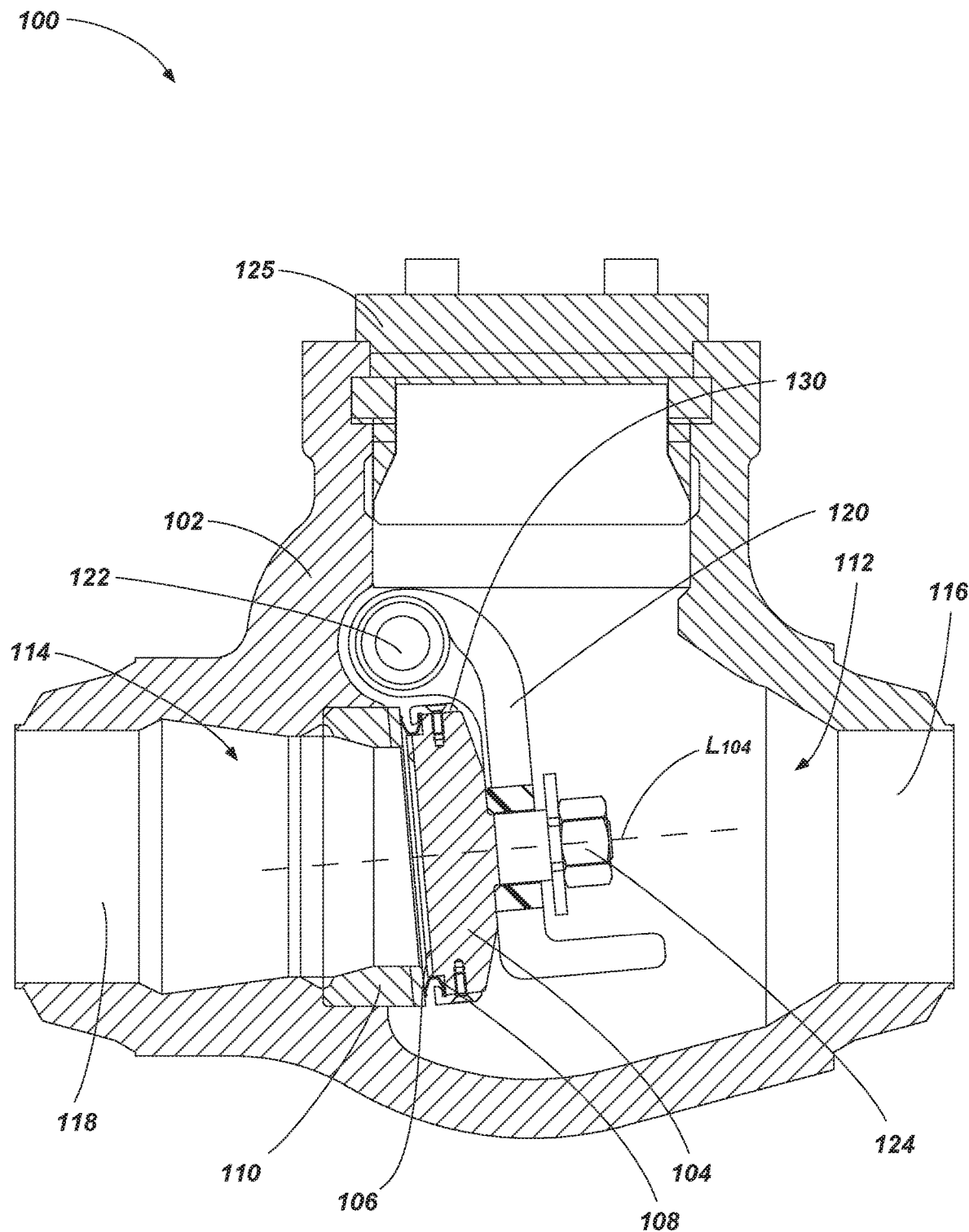
FIG. 3 is a partial cross-sectional side view of the valve of FIG. 1 with the valve member in another closed position.

FIG. 3 shows a partial cross-sectional side view of the valve 100 in another closed position (e.g., a partially closed position or a low pressure or low pressure differential sealing position). As shown in FIG. 3, the second seat 108 may be considered a low pressure seat (e.g., a secondary seat to the primary seat, the first seat 106). For example, the second seat 108 may comprise an at least partially flexible material (e.g., a flexible metal material that is able to elastically deform) having a relatively lower hardness and/or toughness as compared to the first seat 106. The second seat 108 may provide a metal-to-metal seal between the seat portion 110 of the body 102 of the valve 100 and the valve member 104. In some embodiments, the second seat 108 may comprise a metal material, such as, for example, steel, chrome, iron, metal particle matrix composites, alloys (e.g., nickel alloys, such as, INCONEL®, stainless steel), or combinations thereof. In some embodiments, the second seat 108 may be comprised entirely of (e.g., consist of) a metal material.

In some embodiments, the material of the second seat 108 may be selected to enable at least a portion of the second seat 108 to deflect (e.g., to elastically deform) relative to another portion of the second seat 108 in order to provide at least a partial seal between a portion of the second seat 108 and the seat portion 110 of the body 102. For example, and as depicted in FIG. 3, in a partially closed position, the second seat 108 on the valve member 104 may seat against the seat portion 110 of the body 102. Such a partially closed configuration of the valve member 104 may occur where at least some pressure fluid is acting on the first side 112 of the valve member 104 or, in a situation where little or no fluid or pressure differential is presented, where the weight of the valve member 104 acts to place the second seat 108 into contact with the seat portion 110. For example, the fluid on the first side 112 may act to force the valve member 104 into the seat portion 110 of the body 102 to create a seal (e.g., a metal-to-metal seal) between the second seat 108 and the seat portion 110 of the body 102.

Figure 4:
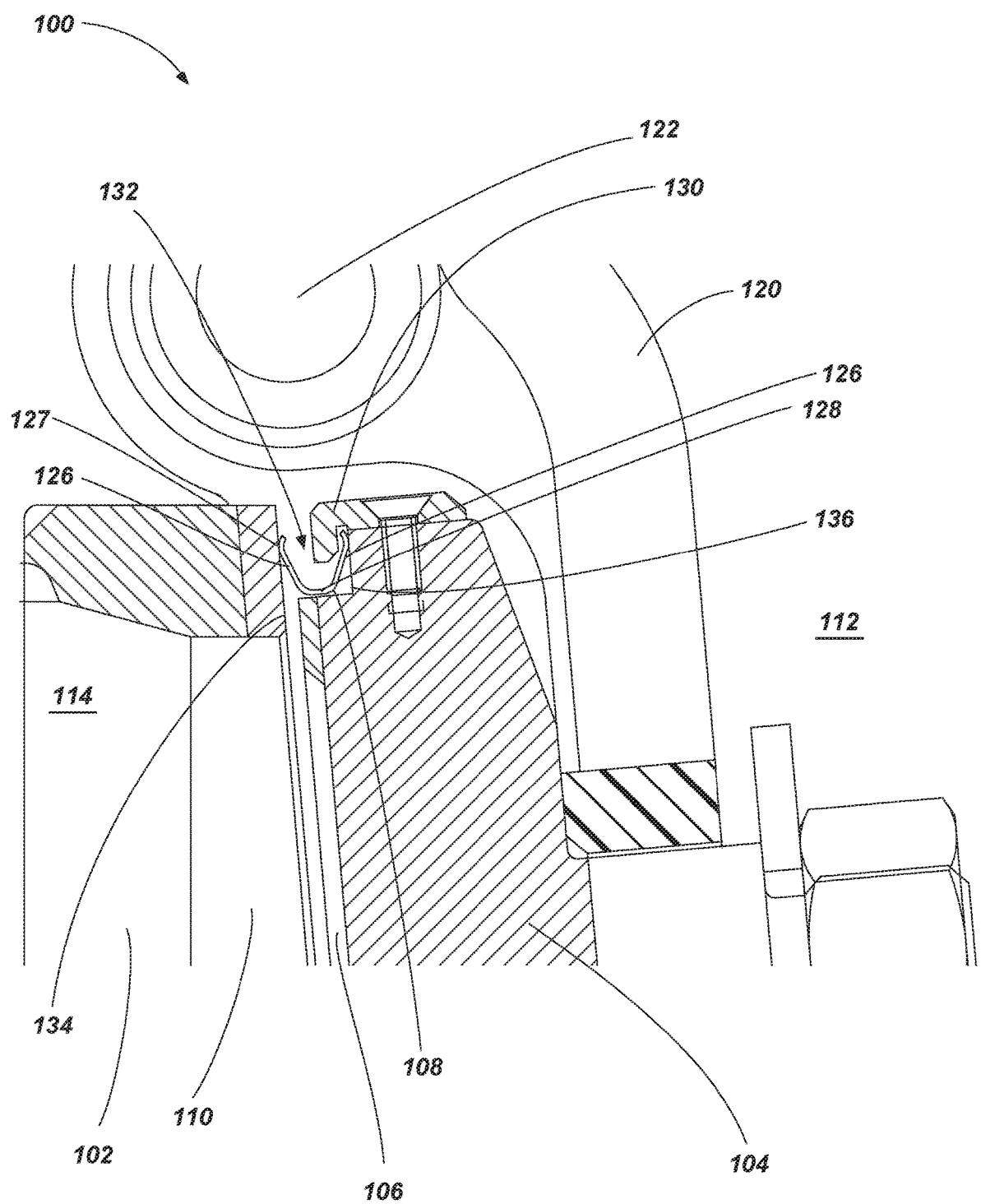
FIG. 4 is an enlarged partial cross-sectional side view of the valve of FIG. 3 with the valve member in the another closed position.

FIG. 4 is an enlarged partial cross-sectional view of the valve of FIG. 3. Referring to FIGS. 3 and 4, a portion of the second seat 108 (e.g., a side portion) may deflect as the second seat 108 comes into contact with the seat portion 110. For example, the second seat 108 may be biased in a direction toward a surface (e.g., sealing surface 134) with which the second seat 108 abuts to provide a seal. The second seat 108 may be biased toward (e.g., in an axial direction along the longitudinal axis $L_{104}$) the seat portion 110 of the valve body 102. As a portion of the second seat 108 comes into contact with the seat portion 110, the biasing force of the second seat 108 may be overcome as at least a portion of the second seat 108 is pushed back toward the valve member 104 (e.g., into the recess 136). However, the biasing force of the second seat 108 will still act to force a portion of the second seat 108 toward the seat portion 110 of the valve body 102 to provide a seal between the valve member 104 and the valve body 102.

The second seat 108 may comprise a spring-like member (e.g., a biasing member), such as, for example, a mainspring, an extension and/or compression spring, a torsion spring, a helical spring, a non-coiled spring (e.g., an S-shaped spring, a C-shaped spring, a V-shaped spring), or any other suitable variations.

As depicted, the second seat 108 may comprise a shape having one or more arms 126 configured to deflect (e.g., cantilevered arms 126 provided by a substantially U-shaped seat, a substantially V-shaped seat, a substantially C-shaped seat, etc.). At least one arm 126 may extend from a center portion 128 and be biased in an outward direction. For example, the arm 126 may extend axially outward at least partially along the longitudinal axis $L_{104}$ (e.g., a centerline, center point, origin) of the valve member 104 or of the second seat 108 and/or along an intended flow path through the valve 100. Upon contact with the seat portion 110, the arm 126 may move inward, but the biasing force of the arm 126 may still apply a force against the seat portion 110 to provide an at least partial seat (e.g., at relatively low pressure differentials) between the valve member 104 and the valve body 102.

As discussed above, the second seat 108 may be coupled to the valve member 104. For example, the second seat 108 may be coupled to the valve member 104 about an outer perimeter (e.g., outer circumference) of the second seat 108. As depicted, the second seat 108 may be coupled to the valve member 104. For example, the coupling member 130 (e.g., flanged ring) may extend at least partially into an opening 132 (see FIG. 4) in the second seat 108 in order to retain the second seat 108, while still enabling the arms 126 to move freely to form a seal with one or more of the valve member 105 and the seat portion 110 of the valve body 102. In some embodiments, the second seat 108 may be coupled to the valve member 104 with the coupling member 130 that is attached to the valve member 104 about an outer perimeter, such as an outer circumference of the valve member 104.

In some embodiments, in an initial (e.g., non-deflected) position, the arm 126 proximate the seat portion 110 may extend to (e.g., be flush with) or even beyond (e.g., axially along the longitudinal axis $L_{104}$ of the valve member 104 and/or along an intended flow path through the valve 100) the first seat 106. In such an embodiment, the second seat 108 may contact the seat portion 110 when the valve member 104 is in the closed position as shown in FIG. 1. For example, both the first seat 106 and the second seat 108 may both contact the seat portion 110 in the closed position shown in FIG. 1. Further, in embodiments where a portion of the second seat 108 extends beyond the first seat 106, the arm 126 of the second seat 108 may be deflected as the first seat 106 contacts the seat portion 110 (e.g., while the arm 126 remains biased toward the seat portion 110).

In some embodiments, the second seat 108 may be configured to provide a pressure-assisted seal (e.g., with the structure of the second seat 108). For example, the second seat 108 may be positioned and configured to enable fluid pressure to deflect one or more of the arms 126 toward the seat portion 110 in an outward direction (e.g., in the axially outward direction). As depicted in FIG. 4, an opening 132 defined within the second seat 108 (e.g., between the arms 126) may enable fluid from the first high pressure side 112 to be resident in the opening 132 and to force at least one of the arms 126 outward toward the seat portion 110 of the body 102. In such a situation, the valve member 104 may be separate from (e.g., spaced from) the seat portion 110 in an initial position; however, the deflection of the arm 126 caused by the fluid pressure on the first side 112 of the valve 100 may act to deflect the arm 126 toward the seat portion 110 and maintain a seal between the second seat 108 and the seat portion 110 by keeping the second seat 108 in contact with the seat portion 110.

In some embodiments, the opening 132 in the second seat 108 may be oriented such that a majority (e.g., an entirety) of the opening 132 is positioned in the outward radial or outward lateral direction relative to the longitudinal axis $L_{104}$ of the valve member 104. In other words, the opening 132 is positioned such that it may only be accessed from a radial direction (e.g., from a radially outward position about the second seat 108). For example, the arms 126 of the second seat 108 may define opposing axial sides of the opening 132 and the center portion 128 may define a radially inward portion of the opening 132, while a majority of the valve member 104 (e.g., the first seat 106) remains spaced from the seat portion 110 of the valve body 102.

The seating or sealing between the second seat 108 and the seat portion 110 of the body 102 may provide an at least partial fluid-tight seal (e.g., a substantially fluid-tight seal) within the valve 100 at least partially inhibiting (e.g., entirely inhibiting) fluid flow through the valve 100 (e.g., to prevent fluid flow, such as backflow, from the first side 112 to the second side 114). As above, the material of the second seat 108 may be selected to enable at least some deflection and/or deformation (e.g., elastic deformation) when the second seat 108 is forced by the fluid pressure on the first side 112.

The flexible second seat 108 may provide such a seal at relatively lower pressures or pressure differential, such as, for example, conditions involving a pressure differential between the first and second sides 112, 114 of between 0 psi or MPa and 1,000 psi (about 6.895 MPa), between 1 psi (about 0.007 MPa) and 800 psi (about 5.516 MPa), etc.

In some embodiments, the second seat 108 may include a crown portion 127 (e.g., a convex surface oriented toward an opposing sealing surface, such as the sealing surface 134 of the seat portion 110) on one or more of the arms 126. The crown portion 127 may provide a contact surface with the sealing surface 134 with a minimized amount of interface surface area between the crown portion 127 of the arm 126 and the sealing surface 134 of the seat portion 110 of the body 102 (e.g., as compared to the relatively larger interface surface area between the first seat 106 and the sealing surface 134 of the seat portion 110). Such an embodiment including a crown portion 127 may act to maximize the seating stress (e.g., by minimizing the surface area at which the force from the arm 126 is applied) to create a seal between the second seat 108 and the seat portion 110 of the valve body 102 (e.g., at relatively lower pressure differentials).

As shown in FIG. 4, in a relatively lower pressure differential sealing environment (e.g., an environment having a pressure differential of greater than 0 psi or MPa and less than 500 psi (about 3.447 MPa), less than 800 psi (about 5.516 MPa), or less than 1,000 psi (about 6.895 MPa)) only the second seat 108 may contact and form a seal between the second seat 108 and the seat portion 110 of the body 102. For example, only the arm 126 of the second seat 108, which may be forced toward the seating portion 110 by fluid pressure or may be positioned to extend axially beyond the first seat 106, may contact and form a seal between the second seat 108 and the seat portion 110 of the body 102.

As shown in FIG. 1, in a relatively higher pressure differential sealing environment (e.g., an environment having a pressure differential of greater than 100 psi (about 0.689 MPa), greater than 500 psi (about 3.447 MPa), greater than 800 psi (about 5.516 MPa), greater than 1,000 psi (about 6.895 MPa), or greater), the first seat 106 and, optionally, the second seat 108 may contact and form a seal between the second seat 108 and the seat portion 110 of the body 102.

Figure 5:
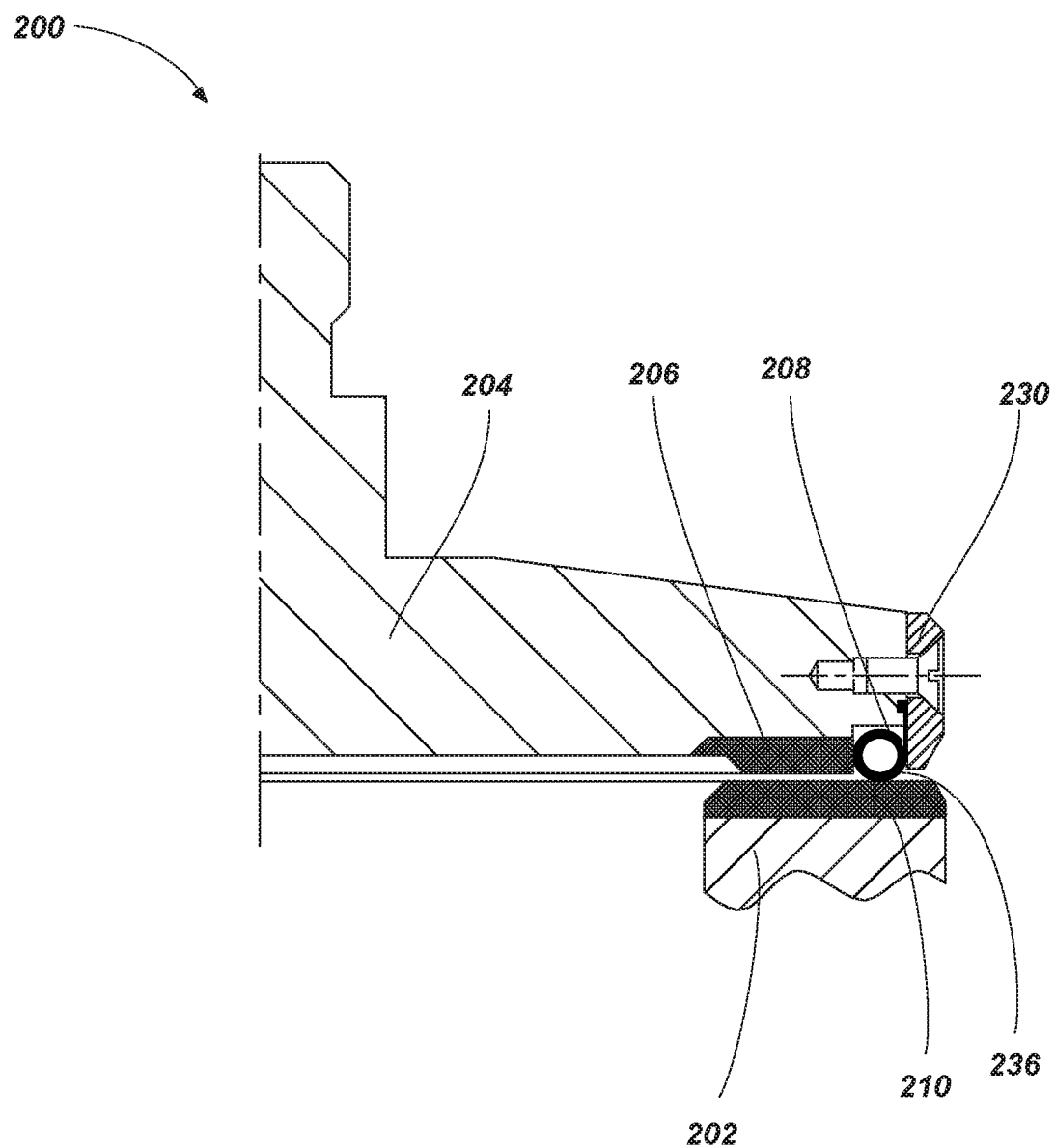
FIG. 5 is an enlarged partial cross-sectional side view of a valve with the valve member in a closed position in accordance with embodiments of the disclosure.

FIG. 5 is an enlarged partial cross-sectional side view of a valve 200 (e.g., a check valve, a globe valve, etc.) with a valve member 204 (e.g., valve disc) in a closed position. In some embodiments, the valve 200 and the valve member 204 may be substantially similar to and include similar or the same components as the valve 100 and valve member 104 discussed above with reference to FIGS. 1 through 4. As shown in FIG. 5, the valve 200 includes a valve body 202 defining a fluid pathway through the valve body 202. The valve member 204 is disposed in the valve body 202 and is in communication with the fluid pathway.

As depicted, a first seat 206 may be considered a high pressure seat (e.g., a primary seat). For example, the first seat 206 may comprise a material having a relatively higher hardness and/or toughness, such as, a metal material. In the closed position, the first seat 206 on the valve member 204 may seat against a seat portion 210 of the body 202 (e.g., to provide a metal-to-metal seal) in a situation where a relativity high pressure fluid is acting on a first side of the valve member 204.

A second seat 208 may be considered a low pressure seat (e.g., a secondary seat to the primary seat, the first seat 206). For example, the second seat 208 may comprise a material (e.g., a metal material) having a relatively lower hardness and/or toughness as compared to the first seat 206. The second seat 208 may provide a metal-to-metal seal between the seat portion 210 of the body 202 of the valve 200 and the valve member 204.

The second seat 208 may be biased in a direction toward a surface with which the second seat 208 abuts to provide a seal. For example, the second seat 208 is biased toward (e.g., in an axial direction) the seat portion 210 of the valve body 202. As a distal portion 236 of the second seat 208 comes into contact with the seat portion 210, the biasing force of the second seat 208 may be overcome as the second seat 208 is pushed back toward the valve member 204. However, the biasing force of the second seat 208 will still act to force the distal portion 236 of the second seat 208 toward the seat portion 210 of the valve body 202 to provide and maintain a seal between the valve member 204 and the valve body 202.

As depicted in FIG. 5, the second seat 208 may comprise a spring-like member (e.g., a mainspring or a torsion spring) for biasing the distal portion 236 toward the seat portion 210 of the body 202. A portion of the second seat 208 (e.g., a proximal end) may be coupled to the valve member 204. For example, an end of the second seat 208 may be coupled to the valve member 204 by a coupling member or ring 230, which extends around an outer portion (e.g., a circumference) of the valve member 204.

Figure 6:
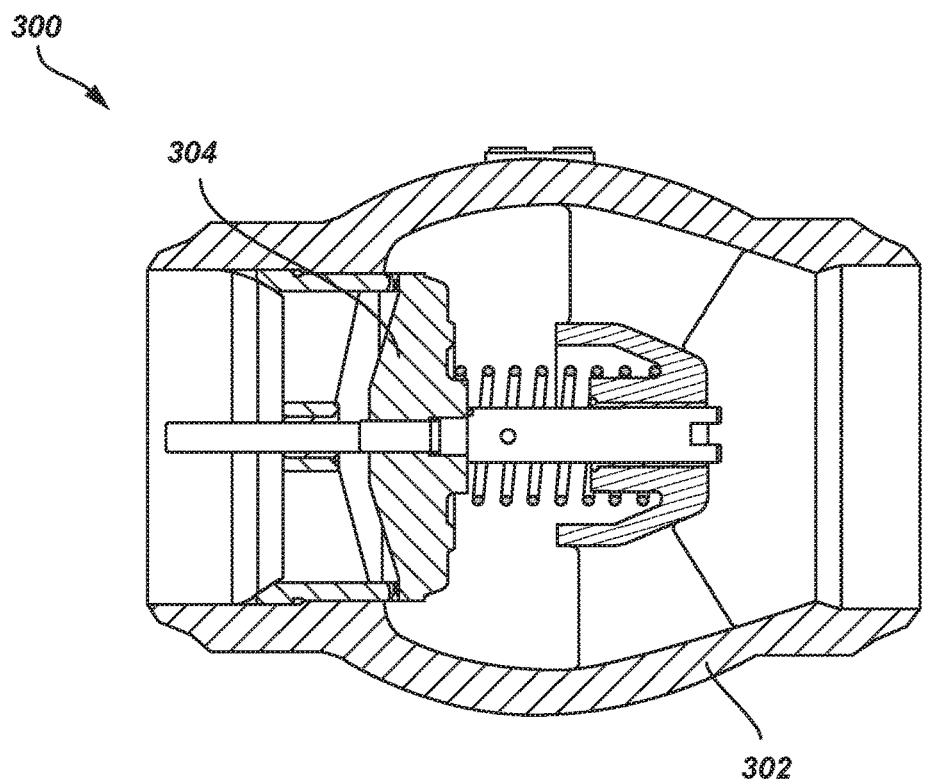
FIG. 6 is a partial cross-sectional side view of an in-line check valve in accordance with embodiments of the disclosure.

FIG. 6 is a partial cross-sectional side view of an in-line check valve 300 that may be substantially similar to and include similar or the same components as the valves 100, 200 and valve members 104, 204 discussed above with reference to FIGS. 1 through 5. Valve 300 includes a valve body 302 and a valve member 304 that is used to form a seal between the valve body 302 and the valve member 304 with two or more seat members (e.g., seats 106, 108, 206, 208 comprising one or more metal materials, as discussed above with reference to FIGS. 1 through 5).

Figure 7:
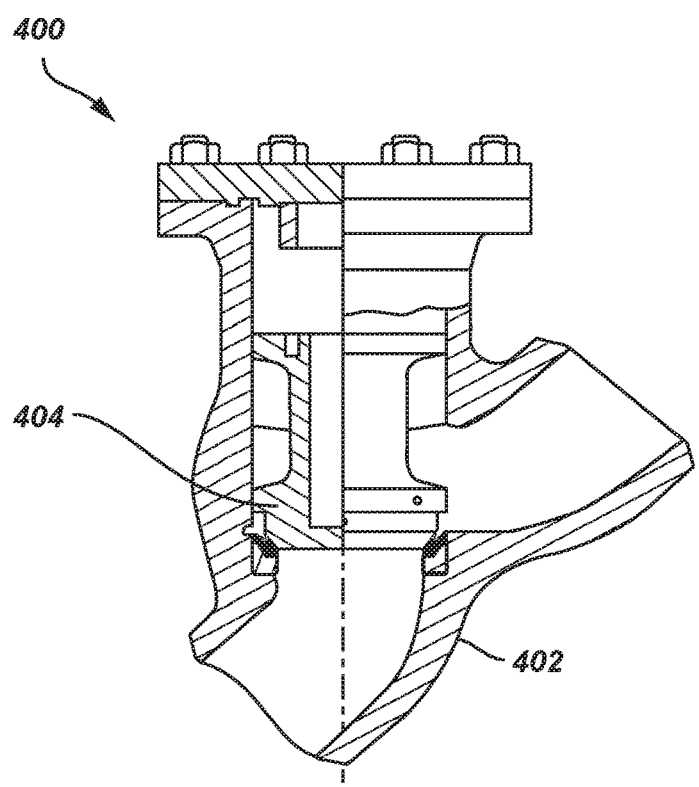
FIG. 7 is a partial cross-sectional side view of a globe valve in accordance with embodiments of the disclosure.

FIG. 7 is a partial cross-sectional side view of a globe valve 400 that may be substantially similar to and include similar or the same components as the valves 100, 200 and valve members 104, 204 discussed above with reference to FIGS. 1 through 5. Valve 400 includes a valve body 402 and a valve member 404 that is used to form a seal between the valve body 402 and the valve member 404 with two or more seat members (e.g., seats 106, 108, 206, 208 comprising one or more metal materials, as discussed above with reference to FIGS. 1 through 5).

Embodiments of the present disclosure may provide valve seats and valves that provide more robust sealing within the valve during both high pressure and low pressure environments (e.g., environments including both low and high pressure differential environments). For example, as discussed above, such valves include a first or primary seat (e.g., a rigid seat) that is configured to provide a seal at relatively higher pressure differentials and a second or secondary seat (e.g., a deflectable or deformable seat) that is configured to provide a seal at relatively lower pressure differentials. Such a configuration may act to provide reliable sealing at lower pressure differentials, which is typically difficult to achieve with only a rigid primary seat, while still being robust enough to function in challenging environmental conditions.

Further, such valve seats may each comprise a metal valve seat, as opposed to other polymer-type or elastomer-type seats, which polymer-type or elastomer-type seats are generally not able to withstand applications involving one or more of high-pressure, high-temperature, caustic, corrosive, and/or abrasive environments. By way of further example, valves in accordance with embodiments of the present disclosure may be particularly useful in applications, such as those including nuclear applications and/or where the valves are implemented in a boiler or other similar systems.

Further still, the secondary seat may provide a contact surface with an opposing sealing surface with a minimized amount of interface surface area between the secondary seat and the sealing surface (e.g., as compared to the relatively larger interface surface area between the primary seat and an associated sealing surface configured to seal at higher pressure differentials). Such a configuration may act to maximize the seating stress (e.g., by minimizing the surface area at which a force from a secondary seat is applied) to create a seal between the secondary seat and the seat portion at relatively lower pressure differentials.

Finally, the ability of the second, lower pressure seat to deflect (e.g., under the force of fluid pressure) enables the seat to provide a more robust seal (e.g., less susceptible to leaking) at lower pressure differentials. Further, such an ability to deflect enables the second, lower pressure seat to conform to uneven sealing surfaces in order to provide a more robust seal.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and equivalents, of the claims that follow.

What is claimed is:

1. A method of providing one or more seals in a valve, the method comprising:
   flowing a fluid through a fluid passage of a valve body, the valve body including a valve member configured to selectively control flow of the fluid through the fluid passage;
   in a first position of the valve member, at least partially inhibiting flow of the fluid through the fluid passage with a rigid seat by defining a seal between a seat portion of the valve body and the valve member; and in a second position of the valve member;
  at least partially inhibiting flow of the fluid through the fluid passage with only a flexible seat by defining another seal between the seat portion of the valve body and the valve member, the flexible seat being positioned radially outside of the rigid seat; and
  deflecting a portion of the flexible seat axially beyond a forward sealing surface of the rigid seat to contact the seat portion of the valve body.

2. The method of claim 1, further comprising deflecting an arm of the flexible seat toward and to contact the seat portion when the valve member is positioned proximate the seat portion of the valve body to at least partially inhibit flow of the fluid through the fluid passage with the valve member and the flexible seat.

3. The method of claim 2, further comprising extending the arm of the flexible seat beyond the rigid seat in a direction toward the seat portion of the valve body.

4. The method of claim 1, further comprising positioning both the flexible seat and the rigid seat on and coupled to the valve member.

5. The method of claim 1, further comprising contacting the seat portion of the valve body with the flexible seat in the first position.

6. The method of claim 1, further comprising:
  at least partially inhibiting the flow of the fluid through the fluid passage with the rigid seat at a first pressure; and
  at least partially inhibiting the flow of the fluid through the fluid passage with only the flexible seat at a second pressure, the second pressure being less than the first pressure.

7. The method of claim 1, further comprising selecting the rigid seat and the flexible seat to comprise metal materials.

8. The method of claim 1, further comprising, in the second position of the valve member:
  contacting the seat portion of the valve body with only the flexible seat; and
  spacing the rigid seat from the seat portion of the valve body in the second position of the valve member.

9. The method of claim 1, further comprising receiving fluid in an opening defined by the flexible seat in order to deflect at least one arm of the flexible seat in a direction away from the valve member in response to a fluid pressure applied to the flexible seat by the fluid in the opening.

10. A method of providing one or more seals in a valve, the method comprising:
  flowing a fluid through a fluid passage of a valve body, the valve body including a valve member configured to selectively control flow of the fluid through the fluid passage;
  in a first position of the valve member, at least partially inhibiting flow of the fluid through the fluid passage with a primary seat by defining a seal between a seat portion of the valve body and the valve member; and
  in a second position of the valve member, at least partially inhibiting flow of the fluid through the fluid passage with only a flexible seat by defining another seal between the seat portion of the valve body and the valve member, comprising:
    deflecting an arm of the flexible seat toward and to contact the seat portion when the valve member is positioned proximate the seat portion of the valve body to at least partially inhibit flow of the fluid through the fluid passage with the valve member and the flexible seat; and
    forcing the arm of the flexible seat toward the seat portion of the valve body with the fluid flowing through the fluid passage.

11. The method of claim 10, further comprising extending the arm of the flexible seat beyond the primary seat in a direction toward the seat portion of the valve body.

12. A method of providing one or more seals in a valve, the method comprising:
  flowing a fluid through a fluid passage of a valve body, the valve body including a valve member configured to selectively control flow of the fluid through the fluid passage;
  at least partially inhibiting flow of the fluid through the fluid passage with a rigid seat by defining a seal between a seat portion of the valve body and the valve member; and
  at least partially inhibiting flow of the fluid through the fluid passage with a flexible seat by defining another seal between the seat portion of the valve body and the valve member, comprising:
    deflecting a portion of the flexible seat toward the seat portion of the valve body in response to a force applied to the flexible seat by flowing the fluid into an opening defined by the flexible seat; and
    contacting the seat portion of the valve body with the portion of the flexible seat.

13. The method of claim 12, further comprising maintaining a space between the rigid seat and the seat portion of the valve body while contacting the seat portion of the valve body with the portion of the flexible seat.

14. The method of claim 12, further comprising:
  contacting the seat portion of the valve body with the portion of the flexible seat at a first pressure differential across the valve member; and
  contacting the seat portion of the valve body with the rigid seat at a second pressure differential across the valve member, the second pressure differential being greater than the first pressure differential.

15. The method of claim 12, further comprising selecting the rigid seat and the flexible seat to comprise a metal material.

16. The method of claim 12, further comprising defining the seal with the rigid seat and the flexible seat.

17. The method of claim 12, further comprising receiving the fluid in the opening defined by the flexible seat in order to deflect an arm of the flexible seat in a direction away from the valve member in response to a fluid pressure applied to the flexible seat by the fluid in the opening.

18. The method of claim 12, further comprising extending an arm of the flexible seat axially beyond a forward sealing surface of the rigid seat to contact the seat portion of the valve body.

19. The method of claim 18, further comprising directing the fluid into the opening defined by the flexible seat along a radial direction of the valve member.

20. The method of claim 12, further comprising:
  providing the another seal between the valve member and the valve body with the flexible seat at a low pressure differential less than 1,000 psi (6.895 MPa); and
  providing the seal between the valve member and the valve body with the rigid seat at a high pressure differential greater than at least 100 psi (3.447 MPa) and less than 11,250 psi (77.566 MPa)).

* * * * *